United States Patent
Ishiwata et al.

(10) Patent No.: US 9,349,538 B2
(45) Date of Patent: May 24, 2016

(54) POLYPROPYLENE FILM FOR CAPACITOR

(75) Inventors: Tadakazu Ishiwata, Konan (JP); Yoshinori Matsuo, Konan (JP); Yuichi Shishido, Konan (JP)

(73) Assignee: Oji Holdings Corporation, Tokyo (JP)

( * ) Notice: Subject to any disclaimer, the term of this patent is extended or adjusted under 35 U.S.C. 154(b) by 40 days.

(21) Appl. No.: 13/977,905

(22) PCT Filed: Jan. 18, 2012

(86) PCT No.: PCT/JP2012/050965
§ 371 (c)(1),
(2), (4) Date: Jul. 1, 2013

(87) PCT Pub. No.: WO2012/099167
PCT Pub. Date: Jul. 26, 2012

(65) Prior Publication Data
US 2013/0288000 A1    Oct. 31, 2013

(30) Foreign Application Priority Data
Jan. 19, 2011   (JP) .................................. 2011-008877

(51) Int. Cl.
*H01G 4/18*    (2006.01)
*C08J 5/18*    (2006.01)
*C08L 23/12*   (2006.01)

(52) U.S. Cl.
CPC ... *H01G 4/18* (2013.01); *C08J 5/18* (2013.01); *C08L 23/12* (2013.01); *C08J 2323/12* (2013.01); *Y10T 428/24355* (2015.01)

(58) Field of Classification Search
CPC .......... C08J 5/18; C08J 2323/12; H01B 3/44; H01G 4/18; C08L 23/12; Y10T 428/24355
USPC .................................................. 428/141, 220
See application file for complete search history.

(56) References Cited

U.S. PATENT DOCUMENTS

2007/0110974 A1 * 5/2007 Ishiwata et al. ............... 428/220
2008/0102247 A1 * 5/2008 Matsuo et al. ................. 428/131
(Continued)

FOREIGN PATENT DOCUMENTS

CN      1289351 A       3/2001
JP      A-10-119127     5/1998
(Continued)

OTHER PUBLICATIONS

International Search Report mailed on Apr. 24, 2012 for International Application No. PCT/JP2012/050965.
(Continued)

*Primary Examiner* — Nathan Van Sell
(74) *Attorney, Agent, or Firm* — Knobbe, Martens, Olson & Bear LLP

(57) ABSTRACT

A biaxially-oriented polypropylene film for an ultra-thin capacitor that has superior heat resistance, withstand voltage performance and long-term durability. The film has a stereoregularity in which mesopentad fraction (mmmm) as determined by measurement of high temperature nuclear magnetic resonance (high temperature NMR) is between 94% and 98%, a weight average molecular weight (Mw) of 250,000 to 450,000, a molecular weight distribution (Mw/Mn) of 4 to 7, and on a molecular weight distribution curve, a difference determined by subtracting the differential distribution value when the logarithm of molecular weight Log(M)=6 from the differential distribution value when Log(M)=4.5 that is 9% to 15%. The film is fabricated using a polypropylene raw material resin in which the composition of the aforementioned molecular weight distribution has been adjusted by peroxidative decomposition treatment of a polypropylene resin.

6 Claims, 1 Drawing Sheet

(56) References Cited

U.S. PATENT DOCUMENTS

| | | | |
|---|---|---|---|
| 2009/0136714 A1* | 5/2009 | Itou | 428/152 |
| 2010/0003489 A1 | 1/2010 | Busch et al. | |

FOREIGN PATENT DOCUMENTS

| | | | | |
|---|---|---|---|---|
| JP | A-2001-106804 | | 4/2001 | |
| JP | A-2006-066615 | | 3/2006 | |
| JP | A-2006-093689 | | 4/2006 | |
| JP | A-2007-137988 | | 6/2007 | |
| JP | A-2007-146026 | | 6/2007 | |
| JP | A-2009-231705 | | 10/2009 | |
| JP | A-2010-501382 | | 1/2010 | |
| JP | 2010254868 A | * | 11/2010 | C08J 5/18 |
| WO | WO 2009/060944 A1 | | 5/2009 | |

OTHER PUBLICATIONS

Polymer Analysis Handbook, New Edition, Japan Society for Analytical Chemistry—Research Committee of Polymer Analysis (ed.), Kinokuniya Co., Ltd., 1995, p. 609.

A. Turner Jones et al., "Crystalline Forms of Isotactic Polypropylene," Makromol. Chem, 75, pp. 134-158, 1964.

T. Hayashi et al., "Heptad configurational analysis of $^{13}C$ n.m.r. spectra in highly isotactic polypropylene," Polymer, vol. 29, pp. 138-143, Jan. 1988.

Luperox Organic Peroxides, *Selection Guide for Polypropylene*, 2006, Philadelphia, PA.

Chinese Office Action issued Jun. 2, 2015 for Chinese Application No. 201280005636.4 filed Jan. 18, 2012, 16 pages.

* cited by examiner

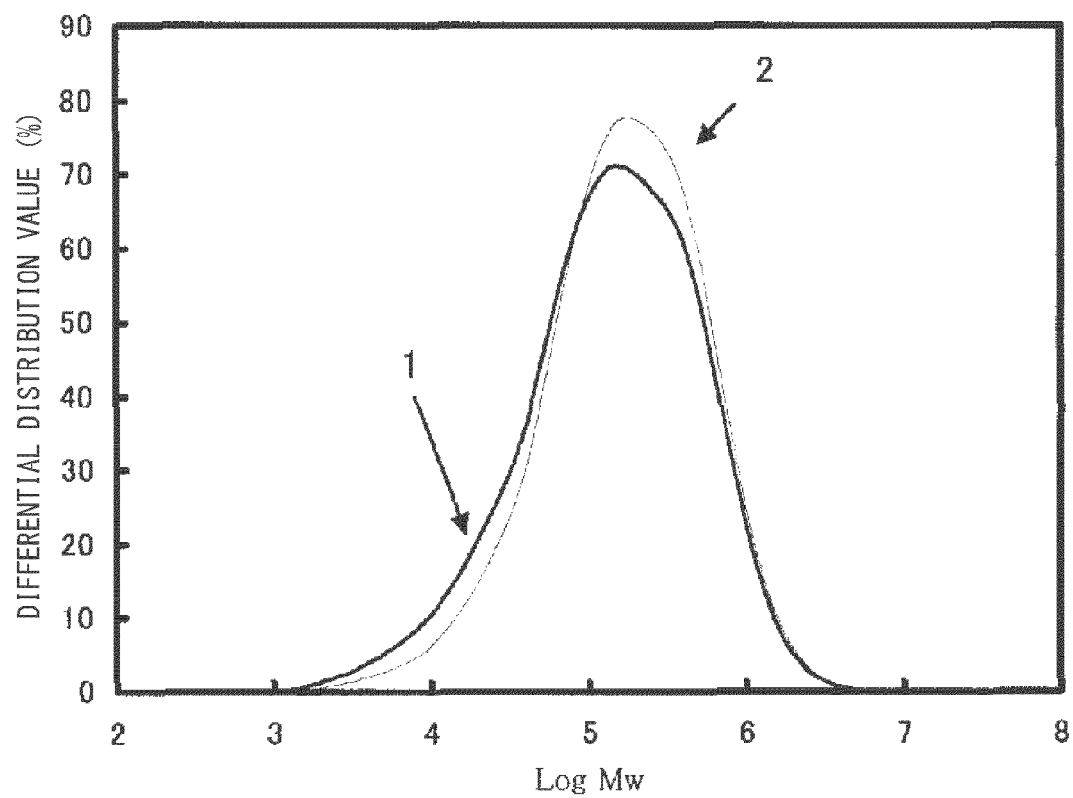

POLYPROPYLENE FILM FOR CAPACITOR

This application is the U.S. National Phase under 35 U.S.C. §371 of International Application PCT/JP2012/050965, filed Jan. 18, 2012, designating the U.S., and published in Japanese as WO 2012/099167 on Jul. 26, 2012, which claims priority to Japanese Patent Application No. 2011-008877, filed Jan. 19, 2011, the contents of which are incorporated herein by reference in their entireties.

TECHNICAL FIELD

The present invention relates to improvement of the heat resistance and withstand voltage of an ultra-thin capacitor film used in electronic device or electrical devices, and more particularly, to a biaxially-oriented polypropylene film for a capacitor preferable for a high-capacitance capacitor that has superior withstand voltage characteristics at high temperatures (improved breakdown voltage value) or long-term durability at high temperatures in the case of being subjected to a high voltage load (so-called long service life and high life performance), and has an extremely thin film thickness.

BACKGROUND ART

Biaxially-oriented polypropylene films are widely used as dielectric films for capacitors by taking advantage of their high moisture resistance in addition to their superior electrical characteristics such as withstand voltage performance and low dielectric loss characteristics.

Polypropylene films for capacitors are preferably used for high-voltage capacitors as well as various types of switching power supplies, converters, inverters and other filters and smoothing capacitors, and the demand for increasingly thin films has increased in recent years due to an extremely strong demand for capacitors having reduced size and higher capacitance.

Moreover, propylene film capacitors are beginning to be widely used as smoothing capacitors in inverter power supply circuits that control the drive motors used in electric vehicles and hybrid vehicles and the like for which demand has been increasing in recent years.

The capacitors for the inverter power supply circuit used in these vehicles and the like must continue to operate stably (by maintaining electrostatic capacitance) while withstanding high direct current voltage for a long period of time and over a wide temperature range of −40° C. to 90° C. as well as retaining compact size, light weight and high capacitance.

Consequently, the capacitor dielectric films used are required to have high withstand voltage characteristics (improved dielectric breakdown voltage) that do not break down (dielectric breakdown) even when subjected to a high direct current voltage load at higher temperatures while still being ultra-thin at a thickness of 1 µm to 5 µm (high stretching performance), and capacitors composed of such films are required to improve long-term durability (minimization of time-based changes in electrostatic capacitance) without breaking down at higher temperatures or at higher voltages and even if continuously subjected to a load for longer periods of time.

Methods for improving the dielectric breakdown voltage of a film by controlling crystallinity and surface smoothing performance have long been proposed for improving withstand voltage characteristics. For example, Patent Document 1 discloses a capacitor composed of a highly stereoregular polypropylene resin that contains an antioxidant. In addition, Patent Document 2, for example, discloses a technology relating to a film, and a capacitor that uses that film which realizes high molten crystallization temperature (high crystallinity) and control of surface smoothing performance by using a polypropylene resin having high melt tension. However, since high stereoregularity and high crystallinity alone cause a decrease in stretchability and result in increased susceptibility to film breakdown in the stretching process, the technology of Patent Document 2 is unable to adequately correspond to the needs of the rapidly growing capacitor market due to being undesirable in terms of production.

On the other hand, in order to improve electrostatic capacitance in a capacitor of equal volume, it is necessary to reduce the thickness of the dielectric film. Although it is essential to improve the stretchability of the resin and cast rolled sheet in order to obtain an ultra-thin film in this manner as was previously described, improving this characteristic is a technique for improving withstand voltage, or in other words, is typically a property that is contradictory to improving crystallinity.

In contrast, Patent Document 3 discloses a finely surface-roughened film that is stretched from a cast roll having a comparatively low amount of β-type crystals using a resin having a balance between a specific range of molecular weight distribution and stereoregularity. This stretched, finely surface-roughened film is a thin film having withstand voltage characteristics, and although it is a finely surface-roughened film that has reached a level capable of satisfying the aforementioned three characteristics as a result of having a suitable degree of surface roughening, there is still room for improvement in order to satisfy severe requirements relating to long-term withstand voltage performance at high temperatures.

Moreover, Patent Document 4 discloses that both high withstand voltage performance and thinned fill can be realized without having to increase stereoregularity by adjusting molecular weight by containing a low molecular weight component. However, there are no examples or suggestions relating to long-term durability or withstand voltage performance required by the market, and thus cannot be said to be adequately satisfactory.

On the other hand, as is also disclosed in Patent Document 1, antioxidant is known to at least have some effect on long-term withstand voltage performance and capacitor electrical performance.

Patent Document 5 discloses a technology for inhibiting dielectric loss to a low level with a suitable combination and incorporated amounts of phenol-based antioxidants. However, there are no examples or suggestions regarding capacitor service life (or life performance (long-term durability)) when subjected to a high voltage load or long-term dielectric performance at high temperatures. More recently, Patent Document 6 discloses a technology for improving insulation resistance at high temperatures by using an antioxidant having a high melting point. However, there are no examples or suggestions regarding long-term withstand voltage performance at high temperatures or when subjected to a high voltage load in this document as well.

In this manner, the severe demand from the rapidly growing capacitor industry for long-term durability (capacitor life (service life) performance) when subjected to high-voltage loads at high temperatures has yet to be satisfied even with the aforementioned technologies.

PRIOR ART DOCUMENTS

Patent Documents

[Patent Document 1] Japanese Unexamined Patent Application, First Publication No. H10-119127 (pp. 2-5)

[Patent Document 2] Japanese Unexamined Patent Application, First Publication No. 2006-93689 (pp. 2-4)
[Patent Document 3] Japanese Unexamined Patent Application, First Publication No. 2007-137988 (pp. 2-4)
[Patent Document 4] International Publication No. WO 2009-060944 (pp. 3-11)
[Patent Document 5] Japanese Unexamined Patent Application, First Publication No. 2007-146026 (pp. 2-3)
[Patent Document 6] Japanese Unexamined Patent Application, First Publication No. 2009-231705 (pp. 2-4)

DISCLOSURE OF THE INVENTION

Problems to be Solved by the Invention

An object of the present invention is to provide a biaxially-oriented polypropylene film for an ultra-thin capacitor that demonstrates only a small decrease in electrostatic capacitance even when continuously subjected to a high direct-current voltage load at high temperatures when used as a capacitor and has high dielectric breakdown voltage characteristics at high temperatures.

Means for Solving the Problems

The present invention includes the aspects described below.

(1) A biaxially-oriented polypropylene film for a capacitor, wherein, together with having stereoregularity in which mesopentad fraction (mmmm) as determined by measurement of high temperature nuclear magnetic resonance (high temperature NMR) is 94% or more to less than 98%, weight average molecular weight (Mw) as measured by gel permeation chromatography (GPC) is 250,000 to 450,000, molecular weight distribution (Mw/Mn) is 4 to 7, and on a molecular weight distribution curve, the difference determined by subtracting the differential distribution value when the logarithm of molecular weight Log(M)=6 from the differential distribution value when the logarithm of molecular weight Log(M)=4.5 is 9% to 15%; and, is fabricated using a polypropylene raw material resin in which the composition of the aforementioned molecular weight distribution has been adjusted by peroxidative decomposition treatment of a polypropylene resin.

(2) The biaxially-oriented polypropylene film for a capacitor according to (1), wherein the biaxially-oriented polypropylene film contains at least one type of hindered phenol-based antioxidant having a carbonyl group, and the residual content thereof in the film is 4000 ppm (by weight) to 6000 ppm (by weight).

(3) The biaxially-oriented polypropylene film for a capacitor according to (1) or (2), wherein the biaxially-oriented polypropylene film is finely surface-roughened, the surface roughness thereof has a center line average roughness (Ra) of 0.05 µm to 0.15 µm, and the maximum height (Rz, formerly Rmax as defined in JIS) is 0.5 µm to 1.5 µm.

(4) The biaxially-oriented polypropylene film for a capacitor according to any of (1) to (3), wherein the thickness of the biaxially-oriented polypropylene film is 1 µm to 5 µm.

(5) A metalized polypropylene film for a capacitor in which metal is deposited on one face or both faces of the biaxially-oriented polypropylene film for a capacitor according to any of (1) to (4).

Effects of the Invention

Since the biaxially-oriented polypropylene film for a capacitor according to the present invention incorporates a larger than normal amount of a low molecular weight component having an average molecular weight on the order of several ten thousands and composes a specific molecular weight distribution by using a raw material polypropylene resin for which molecular weight distribution has been adjusted by peroxidative decomposition treatment, it has the effect of demonstrating high dielectric breakdown strength and having superior durability when subjected to a high voltage load at high temperatures. Moreover, durability when subjected to a high voltage load at high temperatures for a long period of time is improved considerably by suitably incorporating the specific antioxidant according to the present invention within the range described in the present invention.

In addition, since the specific composition of molecular weight distribution also has an effect on resin stretchability, the present invention is also extremely superior for realizing a film for a capacitor having extremely thin film thickness of 1 µm to 5 µm.

As has been described above, according to the present invention, increasing the maximum allowable working temperature of a polypropylene film capacitor, increasing the rated voltage, prolonging the service life (long-term durability), reducing size and increasing capacitance can be realized effectively.

BRIEF DESCRIPTION OF THE DRAWINGS

FIG. 1 is a drawing showing an example of a molecular weight distribution curve relating to a resin 1 and a resin 2 having different compositions of low molecular weight regions.

BEST MODE FOR CARRYING OUT THE INVENTION

The biaxially-oriented polypropylene film for a capacitor of a first aspect of the present invention is a biaxially-oriented polypropylene film, wherein, together with having stereoregularity in which mesopentad fraction (mmmm) as determined by measurement by high temperature nuclear magnetic resonance (high temperature NMR) is 94% or more to less than 98%, weight average molecular weight (Mw) as measured by gel permeation chromatography (GPC) is 250,000 to 450,000, molecular weight distribution (Mw/Mn) is 4 to 7, and on a molecular weight distribution curve, the difference determined by subtracting the differential distribution value when the logarithm of molecular weight Log(M)=6 from the differential distribution value when the logarithm of molecular weight Log(M)=4.5 is 9% to 15%, and uses a polypropylene raw material resin in which the composition of the aforementioned molecular weight distribution has been adjusted by peroxidative decomposition treatment of a polypropylene resin.

The polypropylene resin used in the biaxially-oriented polypropylene film for a capacitor of the present aspect is a crystalline isotactic polypropylene resin that is a homopolymer of propylene.

The film of the present aspect is a biaxially-oriented polypropylene film for a capacitor having molecular properties in which stereoregularity in the form of mesopentad fraction (mmmm), as determined by measuring by high temperature nuclear magnetic resonance (NMR), is preferably 94% or more to less than 98%, and more preferably 95% to 97%.

If the mesopentad fraction (mmmm) is 94% or more, resin crystallinity improves and high withstand voltage characteristics are demonstrated due to highly stereoregular components. If the mesopentad fraction (mmmm) is less than 94%, withstand voltage performance and mechanical heat resistance tend to be inferior. On the other hand, if the mesopentad fraction (mmmm) is 98% or more, the rate of solidification (crystallization) when molding the cast rolled sheet becomes excessively fast, thereby resulting in increased susceptibility to the occurrence of separation from the metal drum used to mold the sheet and decreased stretchability.

There are no particular limitations on the high temperature NMR system used to measure the aforementioned mesopentad fraction (mmmm), and a typically commercially available high temperature nuclear magnetic resonance (NMR) system capable of measuring the degree of stereoregularity of polyolefins can be used, such as the Model JNM-ECP500 High Temperature Fourier Transform Nuclear Magnetic Resonance System (high temperature FT-NMR) manufactured by JEOL Ltd. The observed nucleus is $^{13}C$ (125 MHz), the measuring temperature is 135° C., and a mixed solvent of ortho-dichlorobenzene (ODCB) and deuterated ODCB (mixing ratio=4/1) is used for the solvent. High temperature NMR can be carried out by a known method such as the method described in "Polymer Analysis Handbook, New Edition, Japan Society for Analytical Chemistry—Research Committee of Polymer Analysis (ed.), Kinokuniya Co., Ltd., 1995, p. 610".

Single-pulse proton broad-band decoupling is used for the measurement mode, the pulse width is 9.1 μsec (45° pulse), the pulse interval is 5.5 sec, the cumulative number of measurements is 4,500, and the chemical shift standard is $CH_3$ (mmmm) at 21.7 ppm.

Mesopentad fraction, which represents stereoregularity, is calculated as a percentage from the integrated intensity of each signal derived from a combination (such as mmmm or mrrm) of pentads consisting of pentads arranged in the same direction (mesopentads (m)) and pentads arranged in different directions (racemopentads (r)). A description of spectra such as that in "T. Hayashi, et al., Polymer, Vol. 29, p. 138 (1988)" can be referred to regarding assignment of each signal derived from mmmm, mrrm and the like.

In this manner, as a result of suitably containing the aforementioned low molecular weight component, stretchability is imparted while maintaining high withstand voltage performance even in the absence of extremely high stereoregularity such as that in which the mesopentad fraction exceeds 98%.

The aforementioned mesopentad fraction (mmmm) can be controlled by suitably adjusting the aforementioned polymerization conditions, type of catalyst or amount of catalyst and the like.

In addition, the film of the present aspect has a weight average molecular weight (Mw) as measured by gel permeation chromatography (GPC) of 250,000 to 450,000, and preferably 250,000 to 400,000. Molecular weight distribution as calculated from the ratio of weight average molecular weight (Mw) to number average molecular weight (Mn) as obtained by GPC is preferably 4.5 to 7 and even more preferably 5 to 7.

If the weight average molecular weight exceeds 450,000, resin fluidity decreases remarkably, it becomes difficult to control the thickness of the cast rolled sheet, and since it is no longer possible to accurately fabricate an extremely thin oriented film in the direction of width in accordance with an object of the present invention, this is not preferable in practical terms. In addition, in the case the weight average molecular weight is less than 250,000, although the film has ample extrusion moldability, in addition to increased susceptibility of the occurrence of uneven thickness of the sheet or film, mechanical properties and thermomechanical properties of the resulting sheet decrease, stretchability decreases remarkably, and problems in terms of production and product performance occur in the form of being unable to carry out biaxial orientation molding, thereby making this undesirable.

There are no particular limitations on the gel permeation chromatography (GPC) system used to obtain measured values of molecular weight and molecular weight distribution of the biaxially-oriented polypropylene film, and a typically commercially available high temperature GPC system capable of analyzing the molecular weight of polyolefins can be used, such as the Model HLC-8121GPC-HT High Temperature GPC Measuring System with Internal Differential Refractometer (RI) manufactured by Tosoh Corp. More specifically, three TSKgel GMHHR-H(20)HT columns manufactured by Tosoh Corp. are coupled for use as the GPC column, the column temperature is set to 140° C., trichlorobenzene is used for the eluent, and molecular weight and molecular weight distribution are measured at a flow rate of 1.0 ml/min. A polystyrene standard available from Tosoh Corp. is used to prepare the calibration curve, and measurement results are converted to values for polypropylene. Logarithmic values of weight average molecular weight obtained in this manner are referred to as the logarithm of molecular weight (Log(M)).

Moreover, simultaneous to having values for molecular weight and molecular weight distribution within the aforementioned ranges, the biaxially-oriented polypropylene film for a capacitor of the present aspect is required to have a difference determined by subtracting the differential distribution value when the logarithm of molecular weight Log(M)=6 from the differential distribution value when Log(M)=4.5, as determined from a molecular weight differential distribution curve, of 9% to 15% and preferably 9% to 13%. This means that the molecular weight composition is such that the distribution value of a low molecular weight component for which the logarithm of molecular weight Log(M) is between 4 and 5, or in other words a component having a molecular weight of 10,000 to 100,000 that is lower than the weight average molecular weight (to also be referred to as a "low molecular weight component"), is higher to a certain degree than the distribution value of a high molecular weight component having a Log(M) value of about 6 (molecular weight of about 1,000,000) that is higher than the weight average molecular weight (to also be referred to as a "high molecular weight component") (see FIG. 1). The differential distribution value at Log(M)=4.5 was used as a typical value of the low molecular weight component, while the differential distribution value at Log(M)=6 was used as a typical value of the high molecular weight component.

In other words, even if the molecular weight distribution Mw/Mn is 4 to 7, since this is merely a representation of the width of the range of molecular weight distribution, the compositional status of the high molecular weight component and low molecular weight component cannot be determined from this alone. Therefore, in the present aspect, simultaneous to having a broad molecular weight distribution, stretchability and withstand voltage performance are simultaneously realized by also adjusting the composition of that distribution to a distribution composition that contains a component having a molecular weight of 10,000 to 100,000 at a ratio that is greater to a certain extent than a component having a molecular weight of 1,000,000.

In the biaxially-oriented polypropylene film for a capacitor of the present aspect, since the composition of a low molecular weight component is required to be greater than the composition of a high molecular weight component, a difference obtained by subtracting the differential distribution value when Log(M) on the high molecular weight side that is higher than the weight average molecular weight is 6 from the differential distribution value when Log(M) on the low molecular weight side that is lower than the weight average molecular weight is 4.5 must be "positive", and the amount of that difference is required to be 9% or more. However, if this difference exceeds 15%, difficulties occur with respect to film formation and mechanical heat resistance due to the excessively large amount of the low molecular weight component, thereby making this undesirable in practical terms.

Differential distribution values are typically obtained by GPC in the manner described below. Namely, a time curve of intensity distribution as detected with a differential refractometer (RI) of the GPC system is used as a distribution curve for the logarithm of molecular weight (Log(M)) by using a calibration curve obtained from a substance having a known molecular weight. Since RI detected intensity is proportional to component concentration, an integrated distribution curve can then be obtained with respect to the logarithm of molecular weight Log(M) in the case of assigning a value of 100% to the total area of the distribution curve. A differential distribution curve is obtained by differentiating this integrated distribution curve with Log(M). Thus, differential distribution as referred to here refers to the differential distribution with respect to the molecular weight of a concentration percentage. The relationship according to the present aspect can be obtained by reading the differential distribution value at a specific Log(M) from this curve.

Although high withstand voltage performance can be realized in the prior art by increasing the value of stereoregularity (crystallinity), this alone makes it difficult to decrease stretchability and obtain an extremely thin film. Greater withstand voltage performance and stretchability can be imparted by adjusting the molecular weight, molecular weight distribution and compositional ratio of a high molecular weight component and low molecular weight component of a biaxially-oriented polypropylene film so as to be within the aforementioned ranges.

In the biaxially-oriented polypropylene film of the present aspect, the composition of molecular weight distribution is such that the component for which the molecular weight M of a molecular weight lower than the weight average molecular weight is about 31600 (Log(M)=4.5) is present in a larger amount than the component for which the molecular weight M of a molecular weight higher than the weight average molecular weight is about 1,000,000 (Log(M)=6). In a film in which stereoregularity and molecular weight distribution are nearly the same, the film demonstrates a higher dielectric breakdown voltage (better withstand voltage performance) the lower the molecular weight. In this manner, the withstand voltage performance of a biaxially-oriented polypropylene film can be improved by making a low molecular weight component to be present in a larger amount while maintaining molecular weight distribution within the aforementioned range.

In the present aspect, a method that uses a polypropylene raw material resin in which the high molecular weight component has been selectively subjected to peroxidative decomposition treatment is used to adjust the difference obtained by subtracting the differential distribution value when Log(M) on the higher molecular weight side is 6 from the differential distribution value when Log(M)=4.5 to be between 9% and 15%.

A method that employs peroxidative decomposition treatment using a decomposing agent such as hydrogen peroxide or organic peroxide is preferable for adjusting the composition of the molecular weight distribution of the polypropylene raw material resin by peroxidative decomposition.

When peroxide is added to a decomposable polymer such as polypropylene, a reaction occurs by which hydrogen is extracted from the polymer, and although a portion of the resulting polymer radicals re-bond and undergo a crosslinking reaction, nearly all of the radicals are known to undergo secondary decomposition (β-cleavage) and be divided into two polymers having smaller molecular weights. Thus, there is a high probability that decomposition proceeds starting with the high molecular weight component, and accordingly, the low molecular weight component increases and the composition of molecular weight distribution can be adjusted. An example of a method used to obtain a resin containing a suitable amount of a low molecular weight component by peroxidative decomposition is described below.

A resin can be obtained by adding and adjusting a polymerized powder or pellets of a polypropylene resin obtained by polymerization and an organic peroxide in the form of, for example, 1,3-bis(tertiary-butylperoxyisopropyl)benzene at about 0.001% by weight to 0.5% by weight while considering the target composition of the high molecular weight component and low molecular weight component, followed by melting and kneading with a melt kneader at a temperature of about 180° C. to 300° C.

The obtaining of a target composition of molecular weight distribution (composition of the amount of low molecular weight component) can be achieved by, for example, adjusting the concentration (amount) of organic peroxide and the duration and rotating speed of melting-kneading treatment.

The total ash content attributable to molten reaction treatment and polymerization catalyst residue and the like contained in the polypropylene raw material resin of the present aspect is preferably as low as possible in order to optimize electrical characteristics, and is 50 ppm or less and preferably 40 ppm or less.

Commonly known polymerization methods can be used without restriction for the polymerization method used to produce the polypropylene resin for producing the polypropylene oriented film of the present aspect. Examples of commonly known polymerization methods include vapor phase polymerization, block polymerization and slurry polymerization.

In addition, the polymerization reaction may be a multi-stage polymerization reaction using at least two polymerization reaction vessels, or polymerization may be carried out with a polymerization method consisting of adding a molecular weight adjusting agent in the form of hydrogen or co-monomer to the reaction vessel.

There are no particular limitations on the catalyst used, and a wide range of commonly known Ziegler-Natta catalysts are applicable. In addition, a co-catalyst component or donor may also be contained. Molecular weight distribution can be controlled by suitably adjusting the catalyst and polymerization conditions.

Although short-term withstand voltage performance at high temperatures (i.e. dielectric breakdown voltage value on the order of minutes to hours at high temperature) has been able to be improved in this manner, on the market and particularly in the aforementioned applications in the automobile industry, there is a growing demand for longer service life (i.e. long-term durability) in the case of being continuously subjected to a high voltage load at high temperatures.

When continuously subjected to a high voltage load at high temperatures, heat is generated spontaneously in the film of the capacitor element, and oxidative and thermal degradation proceed with time, thereby causing a decrease in capacitor performance (electrostatic capacitance of the capacitor).

Long-term durability of such a capacitor element (or capacitor film) is frequently evaluated by typically using a method consisting of subjecting a capacitor element to a temperature and voltage higher than the temperature and voltage at which it is actually used to accelerate its service life (i.e. long-term durability). In the case of continuously subjecting the capacitor element to a load consisting of a direct-current high voltage (of, for example, 600 V to 900 V) at an environmental temperature of 100° C. or higher (such as 105° C.), the rate of change in electrostatic capacitance of the capacitor element is recorded over a long period of time (for example, 2000 hours or about 80 days).

Since a capacitor that uses a film that exhibits little degeneration and has favorable long-term durability (long service life) demonstrates a low degree of deterioration even when subjected to a high voltage load for 2000 hours, there is little decrease in electrostatic capacitance. On the other hand, in the case of a capacitor consisting of a film for which deterioration progresses rapidly and has inferior long-term durability, the decrease in capacitance tends to increase over time.

In this manner, long-term durability testing of capacitor films consists of evaluating a capacitor element based on changes in electrostatic capacitance in the case of continuously subjecting to a high-temperature, high-voltage load for a prescribed amount of time (long period of time on the order of several tens of days), and improvement of this parameter is an important technical requirement.

Another aspect of the present invention is a biaxially-oriented polypropylene film for a capacitor that contains one or more types of a hindered phenol-based antioxidant having a carbonyl group and in which the residual content thereof in the film is 4000 ppm (by weight) to 6000 ppm (by weight) for the purpose of inhibiting deterioration over time during long-term use.

Although examples of hindered phenol-based antioxidants having a carbonyl group used in the present aspect include triethylene glycol-bis[3-(3-tertiary-butyl-5-methyl-4-hydroxyphenyl)]propionate (trade name: Irganox 245), 1,6-hexanediol-bis[3-(3,5-di-tertiary-butyl-4-hydroxyphenyl) propionate] (trade name: Irganox 259), pentaerythritol-tetraquis[3-(3,5-di-tertiary-butyl-4-hydroxyphenyl) propionate (trade name: Irganox 1010), 2,2-thio-diethylenebis[3-(3,5-di-tertiary-butyl-4-hydroxyphenyl) propionate] (trade name: Irganox 1035), octadecyl-3-(3,5-di-tertiary-butyl-4-hydroxyphenyl)propionate (trade name: Irganox 1076) and N,N'-hexamethylenebis(3,5-di-tertiary-butyl-4-hydroxy-hydrocinnamide) (trade name: Irganox 1098), pentaerythritol-tetraquis[3-(3,5-di-tertiary-butyl-4-hydroxyphenyl)propionate] is most preferable due to its high molecular weight, ample compatibility with polypropylene, low volatility and superior heat resistance.

The content of the hindered phenol-based antioxidant having a carbonyl group contained in the biaxially-oriented polypropylene film for a capacitor of the present aspect (residual amount in the film) is 4000 ppm (by weight) to 6000 ppm (by weight).

In the case the content of the hindered phenol-based antioxidant having a carbonyl group (residual amount in the film) is less than 4000 ppm (by weight), the effect of inhibiting oxidative degradation in a long-term life test is inadequate, and the effect of improving long-term durability at a high temperature and high voltage is not adequately demonstrated, thereby making this undesirable. On the other hand, if the residual amount in the film exceeds 6000 ppm, the antioxidant per se may become a charge carrier (a certain type of impurity), and as a result thereof, current is generated at high voltage and phenomena leading to breakdown referred to as thermal runaway or rupture and the like occur, thereby conversely resulting in a loss of long-term durability and making this undesirable. The residual content in the film is more preferably 4500 ppm (by weight) to 6000 ppm (by weight), and even more preferably 5000 ppm (by weight) to 6000 ppm (by weight).

A capacitor film containing a hindered phenol-based antioxidant having a carbonyl group, which demonstrates favorable compatibility with polypropylene at the molecular level, within an optimum prescribed range improves long-term durability without causing a decrease in electrostatic capacitance (without allowing deterioration to progress) over a long period of time in excess of 1000 hours (40 days or more) even during accelerated service life (life) testing at an extremely high temperature of 100° C. or higher while maintaining high withstand voltage performance (dielectric breakdown voltage value) obtained by adjusting the low molecular weight component as previously described.

Molecular properties (molecular weight, molecular weight distribution, composition of molecular weight distribution and stereoregularity) of the biaxially-oriented polypropylene film of the aforementioned aspect (to be referred to as the present invention) are not values of the resin per se used to produce the film, but rather are required to be values of the resin that forms the film after going through a film forming step. This resin used to form the film undergoes decomposition due to the occurrence of a certain degree of thermal and oxidative degradation, shear degradation or stretch degradation and the like within an extruder during the film forming step. Accompanying this, molecular weight, molecular weight distribution and stereoregularity frequently differ between the raw material resin and the resin that forms the film following film formation. The molecular properties of the resin that takes on the form of the film has a greater effect on the withstand voltage and heat resistance of the film.

The degree of progression of deterioration, or in other words, changes in molecular weight distribution and stereoregularity, can be adjusted by purging the inside of the extruder with nitrogen (inhibition of oxidation), changing the shape of the screw inside the extruder (shear force), changing the internal shape of the T-die during casting (shear force), changing the amount of antioxidant added (inhibition of oxidation) or changing the winding speed during casting (stretching force) and the like.

Additives such as antioxidants for inhibiting deterioration within the extruders, required stabilizers such as chlorine absorbers or ultraviolet absorbers, lubricants, plasticizers, flame retardants or antistatic agents may be added as necessary to the resin within a range that does not impair the effects of the present invention.

Antioxidants added to the resin are used for at least the two objectives of antioxidants used for the purpose of inhibiting thermal and oxidative degradation inside the extruder (to be referred to as primary agents) and antioxidants that inhibit deterioration and contribute to capacitor performance during long-term use as a capacitor film (to be referred to as secondary agents).

Different types of antioxidants may be used for these two objectives or these two objectives may be attained with a single type of antioxidant.

In the case of using different types of antioxidants, 2,6-di-tertiary-butyl-para-cresol (generic name: BHT) can be added at about 1000 ppm to 4000 ppm as primary agent for the purpose of inhibiting deterioration inside the extruder. Nearly all of the antioxidant used for this purpose is consumed in the molding step within the extruder, and hardly remains at all in the film after film forming (and typically is present at a residual amount of less than 100 ppm).

A hindered phenol-based antioxidant having a carbonyl group is added as secondary agent that contributes to inhibition of deterioration and improvement of performance during long-term use as a capacitor that is an object according to the present invention.

Although examples of hindered phenol-based antioxidants having a carbonyl group include triethylene glycol bis[3-(3-tertiary-butyl-5-methyl-4-hydroxyphenyl)propionate] (trade name: Irganox 245), 1,6-hexanediol-bis[3-(3,5-di-tertiary-butyl-4-hydroxyphenyl)propionate] (trade name: Irganox 259), pentaerythritol-tetrakis[3-(3,5-di-tertiary-butyl-4-hydroxyphenyl)propionate (trade name: Irganox 1010), 2,2-thio-diethylenebis[3-(3,5-di-tertiary-butyl-4-hydroxyphenyl)propionate] (trade name: Irganox 1035), octadecyl-3-(3, 5-di-tertiary-butyl-4-hydroxyphenyl)propionate (trade name: Irganox 1076) and N,N'-hexamethylenebis(3,5-di-tertiary-butyl-4-hydroxy-hydrocinnamide) (trade name: Irganox 1098), pentaerythritol-tetrakis[3-(3,5-di-tertiary-butyl-4-hydroxyphenyl)propionate] is most preferable due to its high molecular weight, ample compatibility with polypropylene, low volatility and superior heat resistance.

The amount added is required to be within the range of 5000 ppm (by weight) to 7000 ppm (by weight), and preferably 5500 ppm (by weight) to 7000 ppm (by weight), based on the total weight of the resin.

It is necessary to use the aforementioned added amount in order to make the residual amount in the film of the hindered phenol-based antioxidant having a carbonyl group contained in the biaxially-oriented polypropylene film for a capacitor according to the present invention to be 4000 ppm (by weight) to 6000 ppm (by weight). This is because the hindered phenol-based antioxidant having a carbonyl group is consumed at least in the extruder regardless of the presence or absence of the primary agent used for the purpose of inhibiting deterioration in the extruder as was previously described. The amount of hindered phenol-based antioxidant having a carbonyl group consumed in the extruder is normally about 1000 ppm to 2000 ppm.

Namely, if the added amount of the hindered phenol-based antioxidant having a carbonyl group is less than 5000 ppm, since the residual amount of antioxidant in the biaxially-oriented polypropylene film for a capacitor becomes less than 4000 ppm, the effect of improving long-term durability at high voltages is not adequately demonstrated, thereby making this undesirable. On the other hand, if the added amount of the hindered phenol-based antioxidant having a carbonyl group is greater than 7000 ppm, the residual amount in the film exceeds 6000 ppm, and as was previously described, the antioxidant per se becomes a charge carrier (a certain type of impurity), and long-term durability conversely tends to be lost.

In the case of not using an antioxidant for the purpose of inhibiting thermal and oxidative degeneration in the extruder, a hindered phenol-based antioxidant having a carbonyl group is used instead for the antioxidant used for this purpose. In this case, since a considerable amount of the hindered phenol-based antioxidant having a carbonyl group is consumed for inhibition of deterioration in the extruder during the molding step, the amount added is preferably somewhat greater at 6000 ppm (by weight) to 7000 ppm (by weight) based on the total weight of the resin.

Various types of known methods can be employed for the method used to mold the cast rolled sheet prior to stretching in order to produce the biaxially-oriented polypropylene film of the present invention. For example, a method can be employed in which, after supplying raw material pellets consisting of dry-mixed polypropylene resin pellets (and/or polymerized powder), or mixed polypropylene pellets fabricated by melting and kneading in advance, to an extruder, heating and melting the pellets, and passing through a filtration filter, the molten pellets are heated and melted at 170° C. to 320° C., and preferably 200° C. to 300° C., extruded as a melt from a T-die, and cooled with at least one metal drum held at 80° C. to 140° C. to solidify and mold an unstretched cast rolled sheet.

During molding of this sheet, the β crystal fraction of the resulting cast rolled sheet is about 1% to 50%, and preferably about 5% or more to less than 30%, as determined X-ray analysis by holding the temperature of the metal drum group to 80° C. to 140° C. and preferably 90° C. to 120° C. Furthermore, this value is the value when not containing a β crystal nucleating agent.

As was previously described, although an excessively low β crystal fraction tends to be inferior for processing suitability such as element winding since it smoothens the film surface, capacitor characteristics such as withstand voltage characteristics improve. However, if the β crystal fraction is within the aforementioned ranges, both capacitor characteristics and processing suitability such as element winding can be adequately satisfied.

The aforementioned β crystal fraction is obtained by measurement of X-ray diffraction intensity, and is a value referred to as K value that is calculated according to the method described in "A. Turner-Jones, et al., Makromol. Chem., Vol. 75, p. 134 (1964)". Namely, the ratio of β crystals is represented by the sum of three diffraction peak heights derived from α crystals and the ratio of a single diffraction peak derived from β crystals.

Although there are no particular limitations on the thickness of the aforementioned cast rolled sheet, it is normally 0.05 mm to 2 mm and preferably 0.1 mm to 1 mm.

The biaxially-oriented polypropylene film for a capacitor of the present invention can be fabricated by carrying out stretching treatment on the aforementioned polypropylene cast rolled sheet. Stretching is preferably biaxial stretching consisting of orienting biaxially in the longitudinal and lateral directions, and a successive biaxial stretching method is preferable for the stretching method. Successive biaxial stretching consists of first holding the cast rolled sheet at 100° C. to 160° C., stretching at a stretching ratio of 3 to 7 in the direction of flow by passing between rolls provided with different speeds, and immediately cooling to room temperature. As a result of suitably adjusting the temperature of this longitudinal stretching step, β crystals melt and are transformed to α crystals resulting in the actualization of surface irregularities. Continuing, the stretched film is guided to a tenter, where after being stretched at a stretching ratio of 3 to 11 in the direction of width at a temperature of 160° C. or higher, is subjected to relaxation and heat fixing following by winding.

The wound film is subjected to aging treatment in an atmosphere at about 20° C. to 45° C., after which it can be cut to a desired product width.

As a result of this type of stretching step, the resulting film has superior mechanical strength and rigidity and the surface irregularities are more clearly defined, thereby resulting in a stretched film having a finely roughened surface. The surface of the film of the present invention is preferably imparted with suitable surface roughness that results in favorable capacitor characteristics while improving element winding suitability.

In still another aspect of the present invention, at least one side of a biaxially-oriented polypropylene film is finely surface-roughened so that the center line average roughness (Ra) is 0.05 μm to 0.15 μm, and the maximum height (Rz, formerly Rmax as defined in JIS) is 0.5 μm to 1.5 μm.

If the values of Ra and Rz (formerly Rmax as defined in JIS) are large values to a certain extent, the film slides suitably due to the formation of suitable gaps between the film during processing such as winding and rewinding and during element winding processing during capacitor processing, thereby resulting in less susceptibility to the formation of wrinkles during winding as well as the occurrence of lateral shifting. However, if these values are excessively large, in addition to the occurrence of problems in terms of practical use such as surface luster or transparency, decreases in weight and thickness occur due to an increase in the size of the interlayer gap between films, thereby leading to a decrease in withstand voltage performance and making this undesirable. Conversely, if the surface is smooth to a certain degree that the volume of protrusions decreases, although this is advantageous in terms of withstand voltage performance, if this value becomes excessively low, the film becomes resistant to sliding resulting in increased susceptibility to the formation of wrinkles during winding processing, which in addition to being undesirable due to decreased productivity, the formation of fine wrinkles and the like leads to poor withstand voltage performance of the capacitor, thereby making it unsuitable for practical use.

Ra and Rz (formerly Rmax as defined in JIS) are typically measured using a commonly used contact probe-type or non-contact-type surface roughness tester according to the method defined in JIS-B0601:2001, for example. There are no limitations whatsoever on the manufacturer or type of instrument. In a study carried out in the present invention, Ra and Rz (formerly Rmax as defined in JIS) were determined using the Model SE-30 Universal Surface Shape Measuring Instrument manufactured by Kosaka Laboratory Ltd. with the AY-41 Surface Roughness Analyzer in compliance with the method defined in JIS-B0601:2001. Although measurement can be carried out using a contact method (contact type using a diamond probe and the like) or a non-contact method (non-contact detection by laser light and the like), in the study in the present invention, measurement was carried out using a contact method, and reliability of the values was confirmed by using values obtained by a non-contact method as a supplemental reference as necessary.

Although various known types of surface roughening methods such as embossing or etching can be employed to impart fine surface irregularities to the film surface, surface roughening using β crystals is preferable since there is no need to introduce impurities. The rate at which β crystals are formed can typically be controlled according to the casting temperature and casting speed. In addition, the melting/transformation ratio of β crystals can be controlled with the roll temperature of the longitudinal stretching step, and a finely roughened surface can be obtained by selecting the optimum production conditions for these two parameters of β crystal formation and their melting/transformation.

In the present invention, since the characteristic state in which microcrystals are formed is realized by changes in crystallization behavior attributable to the low molecular weight component within the range according to the present invention, useful effects can also be obtained for forming β crystals in order to obtain fine surface irregularities. In other words, small spherulite size and spherulite density, which is not excessively high, can be controlled according to the characteristic composition of molecular weight distribution according to the present invention without having to significantly change the production conditions of the polypropylene biaxially-oriented film from conventional conditions for adjusting the ratio of β crystal formation, thereby making it possible to realize the aforementioned surface roughness according to the present invention as well as effectively impart winding processing suitability without impairing other performance.

Still another aspect of the present invention is a biaxially-oriented polypropylene film for an ultra-thin capacitor in which the thickness of the biaxially-oriented propylene film of the present invention is 1 μm to 5 μm, preferably 1.5 μm to 4 μm, and more preferably 1.8 μm to 3.5 μm.

In the biaxially-oriented polypropylene film for a capacitor of the present invention, corona discharge treatment may be carried out online or offline following completion of the stretching and heat fixing steps for the purpose of enhancing adhesive properties in post-processing such as a metal deposition processing step. Although a known method can be used for corona discharge treatment, processing is preferably carried out using air, carbon dioxide gas, nitrogen gas or a mixed gas thereof for the atmospheric gas.

In addition to the hindered phenol-based antioxidant having a carbonyl group, a required stabilizer such as a chlorine absorber may also be added to the biaxially-oriented polypropylene film for a capacitor of the present invention within a range that does not have an effect on capacitor characteristics, and a metal soap such as calcium stearate is preferably used for the chlorine absorber.

The content of ash contained in the biaxially-oriented polypropylene film for a capacitor of the present invention is preferably as low as possible in order to optimize electrical characteristics, and is 50 ppm or less and preferably 40 ppm or less.

There are no particular limitations on the electrodes when processing the biaxially-oriented polypropylene film for a capacitor of the present invention as a capacitor, and although metal foil, a paper which at least one side thereof is metalized or plastic film of which at least one side thereof is metalized is favorable, in capacitor applications requiring even greater reductions in size and weight, an electrode in which one side or both sides of the film of the present invention are metalized directly is preferable. Although there are no restrictions on the metal used to metalize the film at this time, and examples thereof include elementary metals such as zinc, lead, silver, chromium, aluminum, copper or nickel, mixtures of multiple types of metals and alloys, zinc and aluminum are preferable in consideration of the environment, economic factors, capacitor performance and the like.

Although examples of methods used in the case of directly metalizing the biaxially-oriented polypropylene film for a capacitor of the present invention include vacuum deposition and sputtering, the method used is not limited thereto, and vacuum deposition is preferable from the viewpoint of productivity, economic factors and the like. Although typical examples of vacuum deposition methods include those using a crucible and those using a wire, there are no particular limitations thereon, and the optimum method is suitably selected.

Although are also no particular limitations on the margin pattern during metallization by deposition, in the case of forming a pattern that includes so-called special margins in the manner of a fishnet pattern or T-margin pattern and the like on at least one side of the film of the present invention from the viewpoint of improving characteristics such as safety of a capacitor, it is also effective from the viewpoints of enhancing safety, preventing breakdown and shorting of the capacitor and the like, thereby making this preferable.

A commonly known method such as the use of tape or oil masking can be used to form margins without any restrictions thereon.

Since the surface of this biaxially-oriented polypropylene film for a capacitor is finely roughened, it has superior element winding suitability, high withstand voltage characteristics and is extremely thin, thereby making it easy to demonstrate high electrostatic capacitance while also have superior long-term durability, and making it extremely preferable for a compact, high-capacitance capacitor of 5 µF or more, preferably 10 µF or more and even more preferably 20 µF or more.

EXAMPLES

Although the following provides a more detailed explanation of the present invention according to examples thereof, the scope of the present invention is naturally not limited thereto. In addition, the terms "parts" and "%" used in the examples respectively indicate "parts by weight" and "% by weight" unless specifically indicated otherwise.

[Methods Used to Measure Characteristic Values and Evaluate Effects]

The methods used to measure characteristic values and evaluate effects in the examples are as indicated below.

(1) Measurement of Weight Average Molecular Weight (Mw), Molecular Weight Distribution (Mw/Mn) and Differential Distribution Value Evaluations of molecular weight (Mw), molecular weight distribution (Mw/Mn) and the differential distribution value of a distribution curve of a biaxially-oriented polypropylene film were carried out by measuring under the following conditions using gel permeation chromatography (GPC).

Measuring instrument: Model HLC-8121GPC-HT High Temperature
GPC Measuring System with Internal Differential Refractometer (RI) manufactured by Tosoh Corp.
Column: Three coupled TSKgel GMHHR-H(20)HT columns manufactured by Tosoh Corp.
Column temperature: 140° C.
Eluent: Trichlorobenzene
Flow rate: 1.0 ml/min A polystyrene standard available from Tosoh Corp. was used to prepare the calibration curve, and measurement results were converted to values for polypropylene.

Differential distribution values were obtained using the method described below. First, a time curve of intensity distribution (elution curve) as detected with an RI detector was used as a distribution curve with respect to molecular weight (Log(M)) using a calibration curve. Next, after obtaining an integrated distribution curve with respect to Log(M) in the case of assigning a value of 100% to the total area of the distribution curve, a differential distribution curve with respect to Log(M) was able to be obtained by differentiating this differential distribution curve with Log(M). The differential distribution values when Log(M)=4.5 and Log(M)=6 were then read from this differential distribution curve. Furthermore, the series of operations for obtaining the differential distribution curve can normally be carried out using analytical software incorporated in the GPC measuring system.

(2) Measurement of Mesopentad Fraction (mmmm)

Mesopentad fraction (mmmm) was determined under the following conditions using a high temperature Fourier transform nuclear magnetic resonance system (high temperature FT-NMR) after dissolving the biaxially-oriented polypropylene film in a solvent.

Measuring instrument: Model JNM-ECP500 High Temperature FT-NMR manufactured by JEOL Ltd.
Observed nucleus: $^{13}$C (125 MHz)
Measuring temperature: 135° C.
Solvent: Mixed solvent of ortho-dichlorobenzene (ODCB) and deuterated ODCB (4/1)
Measurement mode: Single-pulse proton broad-band decoupling
Pulse width: 9.1 µsec (45° pulse)
Pulse interval: 5.5 sec
Cumulative number of measurements: 4500
Chemical shift standard: $CH_3$ (mmmm)=21.7 ppm.

Mesopentad fraction was calculated as a percentage (%) from the integrated intensity value of each signal derived from a combination of pentads (such as mmmm or mrrm). A description of spectra such as that in "T. Hayashi, et al., Polymer, Vol. 29, p. 138 (1988)" was referred to regarding assignment of each signal derived from mmmm, mrrm and the like.

(3) Measurement of Residual Amount of Antioxidant in Biaxially-Oriented Polypropylene Film The biaxially-oriented polypropylene film was cut into pieces followed by addition of solvent and extracting the antioxidant remaining in the film by ultrasonic extraction.

The resulting extract was used to measure the secondary agent using a high-performance liquid chromatograph and ultraviolet detector. The residual amount of the secondary agent was calculated from the peak intensity of the resulting chromatograph using a predetermined calibration curve.

(4) Measurement of Surface Roughness

Measurement of center line surface roughness (Ra) and maximum height (Rz) of the biaxially-oriented polypropylene film was carried out using the Model SE-30 Universal Surface Shape Measuring Instrument manufactured by Kosaka Laboratory Ltd., and were determined with the AY-41 Surface Roughness Analyzer in compliance with the method defined in JIS-B0601:2001. Measurements were carried out three times and the average value thereof was used for evaluation. In this evaluation, measurements were carried out using a contact method, and reliability of the values was confirmed by supplementing with values obtained with a non-contact method as necessary.

(5) Evaluation of Film Thickness

Thickness of the biaxially-oriented polypropylene film was measured using a micrometer (JIS-B7502) in compliance with JIS-C2330.

(6) Evaluation of High-Temperature Withstand Voltage Performance (High-Temperature Dielectric Breakdown Strength) of Film Withstand voltage performance of the biaxially-oriented film was evaluated by measuring dielectric breakdown voltage in compliance with JIS-C2330 7.4.11.2 (Breakdown Voltage and Plate Electrode Method: Method B). The voltage increase rate was set to 100 V/sec, the cutoff current at breakdown was set to 10 mA, and the number of measurements was set to 18. Here, values obtained by dividing the measured average voltage values by film thickness were used to evaluate dielectric breakdown strength. Measurements were carried out at an evaluation temperature of 100° C. by placing the film and an electrode jig in an air-circulating high-temperature chamber.

High-temperature dielectric breakdown strength of 450 V/µm or more is desirable in terms of practical use, and a value of 450 V/µm or more can be said to represent even more preferable withstand voltage performance.

(7) Fabrication of Capacitor Element (Evaluation of Element Winding Suitability)

A T-margin deposition pattern was formed on the biaxially-oriented polypropylene film by carrying out aluminum deposition at a deposition resistance of 12Ω/|| to obtain a metalized film. After making narrow slits in the metalized film, two pieces of metalized film were combined by winding for 1150 turns at a winding tension of 400 g using the Model 3KAW-N2 Automated Winding Machine manufactured by Kaido Mfg. Co., Ltd.

Processing suitability during element winding was evaluated qualitatively by visual examination.

After carrying out heat treatment on the wound element for 6 hours at 120° C. while pressing, zinc metal was deposited on the ends of the element to obtain a flat capacitor. The electrostatic capacitance of the resulting capacitor was 100 μF (±5 μF).

(8) Accelerated Service Life (Life) Test of Capacitor Element (Long-Term Durability at High Temperature)

The resulting capacitor element was subjected to an accelerated life test according to the procedure described below by assuming use as an inverter for controlling an automobile drive motor at a maximum environmental temperature of 90° C. and maximum voltage of 700 V.

After preheating the element at the test environment temperature (105° C. (assumed maximum temperature+15° C.) in advance, initial electrostatic capacitance prior to testing was evaluated with the Model AG4311 LCR Tester manufactured by Ando Electric Co., Ltd. Next, the capacitor element was continuously subjected to a direct-current voltage load of 750 V (assumed maximum voltage+50V) for 500 hours using a high-voltage power supply in a high-temperature chamber at 105° C. The capacitance of the element after 500 hours had elapsed was measured with the LCR Tester and the rate of change in capacitance before and after applying the voltage load was calculated. Next, the element was again returned to the high-temperature chamber and further subjected to the voltage load for 500 hours followed by determining the change in capacitance (cumulative) after 1000 hours had elapsed (cumulative) and repeating this procedure until 2000 hours had elapsed. The rate of change in capacitance after 2000 hours had elapsed was determined and used to evaluate the average value of three elements. The rate of change in capacitance is preferably within ±5% after 2000 hours in terms of practical use.

(9) Overall Evaluation as Capacitor Film

An overall evaluation of suitably as a capacitor film was made with respect to such parameters as whether or not a capacitor element can be fabricated with a film of 5 μm or less required for improving electrostatic capacitance, dielectric breakdown strength (withstand voltage performance) of the film at high temperatures, and long-term durability at high temperature when used as a capacitor element. Films demonstrating improved performance based on the prior art were evaluated as "A", those demonstrating performance no different from that of the prior art were evaluated as "B", and those demonstrating performance inferior to that of the prior art were evaluated as "C".

[Polypropylene Resin]

A polypropylene resin E, for which molecular weight distribution was not adjusted (melt flow index: 4 g/10 min, weight average molecular weight: 300,000, mesopentad fraction: 96%) was acquired from Prime Polymer Co., Ltd.

In addition, molecular weight distribution-adjusted resins A to D were obtained by carrying out peroxidation treatment by melting and kneading this polypropylene resin E with organic peroxide. Moreover, molecular weight distribution-adjusted resin F was obtained that was subjected to peroxidative decomposition treatment by melting and kneading with a propylene resin having low stereoregularity (mesopentad fraction: 93.5%). In addition, a polypropylene resin G, in which molecular weight had been adjusted by adding and mixing a high melt flow resin based on resin E, was obtained for comparison.

Antioxidants (secondary agent) were added to polypropylene resins A to G.

Table 1 summarizes the presence or absence of peroxidative decomposition treatment carried out on biaxially-oriented polypropylene films obtained from these resins, the difference in the molecular weight differential distribution values, weight average molecular weights (Mw), molecular weight distributions (Mw/Mn), stereoregularity (mesopentad fractions) and residual amounts of antioxidant (secondary agent).

Furthermore, the values shown in Table 1 are analytical values of the films.

Example 1

A raw material resin A, for which molecular weight distribution was adjusted by carrying out peroxidative decomposition treatment by adding 5000 ppm of a secondary antioxidant in the form of Irganox® 1010 and 20 ppm of 2,5-dimethyl-2,5-di(t-butylperoxy)hexane to the resin E manufactured by Prime Polymer Co., Ltd. followed by melting and kneading with a granulator, was supplied to an extruder followed by melting at a resin temperature of 250° C., extruding using a T-die, and winding and solidifying on a metal drum held to a surface temperature of 95° C. to fabricate a cast rolled sheet having a thickness of about 140 μm. Continuing, this unstretched cast rolled sheet was stretched at a stretching ratio of 5 in the direction of flow at a temperature of 140° C., and after immediately cooling to room temperature, was stretched at a stretching ratio of 10 in the lateral direction at a temperature of 165° C. with a tenter to obtain an extremely thin biaxially-oriented polypropylene film having a thickness of 2.8 μm. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Example 2

An extremely thin biaxially-oriented polypropylene film having a thickness of 2.8 μm was obtained in the same manner as Example 1 with the exception of supplying to the extruder a raw material resin B obtained by adding the secondary antioxidant in the form of Irganox® 1010 in the same manner as Example 1 to a molecular weight distribution-adjusted resin B subjected to oxidative decomposition treatment instead of the raw material resin A of Example 1. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Example 3

An extremely thin biaxially-oriented polypropylene film having a thickness of 2.8 μm was obtained in the same manner as Example 1 with the exception of supplying to the extruder a raw material resin C obtained by adding 5500 ppm of the secondary antioxidant in the form of Irganox® 1010 to a molecular weight distribution-adjusted resin C subjected to oxidative decomposition treatment instead of the raw material resin A of Example 1. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Example 4

An extremely thin biaxially-oriented polypropylene film having a thickness of 2.8 μm was obtained in the same manner as Example 1 with the exception of supplying to the extruder a raw material resin D obtained by adding 6000 ppm of the secondary antioxidant in the form of Irganox® 1010 to a molecular weight distribution-adjusted resin D subjected to oxidative decomposition treatment instead of the raw material resin A of Example 1. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Example 5

The raw material resin A of Example 1 was supplied to an extruder followed by melting at a resin temperature of 250° C., extruding using a T-die, and winding and solidifying on a metal drum held to a surface temperature of 95° C. to fabricate a cast rolled sheet having a thickness of about 125 μm. Continuing, this unstretched cast rolled sheet was stretched at a stretching ratio of 5 in the direction of flow at a temperature of 140° C., and after immediately cooling to room temperature, was stretched at a stretching ratio of 10 in the lateral direction at a temperature of 165° C. with a tenter to obtain an extremely thin biaxially-oriented polypropylene film having a thickness of 2.5 μm. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Comparative Example 1

An extremely thin biaxially-oriented polypropylene film having a thickness of 2.8 μm was obtained in the same manner as Example 1 with the exception of supplying to the extruder a raw material resin E obtained by adding 4000 ppm of the secondary antioxidant in the form of Irganox® 1010 to a resin E for which the composition of molecular weight distribution was adjusted according to a polymerization method by referring to Example 2 of Patent Document 4 (International Publication No. WO 2009-060944). The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Comparative Example 2

An extremely thin biaxially-oriented polypropylene film having a thickness of 2.8 μm was obtained in the same manner as Example 1 with the exception of supplying to the extruder a raw material resin E' obtained by adding 5000 ppm of the secondary antioxidant in the form of Irganox® 1010 to resin E for which the composition of molecular weight distribution was adjusted according to a polymerization method. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Comparative Example 3

An extremely thin biaxially-oriented polypropylene film having a thickness of 2.8 μm was obtained in the same manner as Example 1 with the exception of supplying to the extruder a raw material resin F obtained by adding 5000 ppm of the secondary antioxidant in the form of Irganox® 1010 to a molecular weight distribution-adjusted resin F subjected to peroxidative decomposition treatment by melting and kneading organic peroxide with a polypropylene resin manufactured by Prime Polymer Co., Ltd. (melt flow index: 3 g/10 min, average molecular weight: 350,000, mesopentad fraction: 93.5%) instead of the raw material resin A of Example 1. The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

Comparative Example 4

An extremely thin biaxially-oriented polypropylene film having a thickness of 2.8 μm was obtained in the same manner as Example 1 with the exception of supplying to the extruder a raw material resin F obtained by adding 4000 ppm of the secondary antioxidant in the form of Irganox® 1010 to a polypropylene resin G, for which molecular weight distribution was adjusted by adding and mixing 15% of a high melt flow resin (melt flow index: 9 g/10 min) manufactured by Prime Polymer Co., Ltd. based on resin E, instead of the raw material resin A of Example 1 by referring to Example 2 of Patent Document 4 (International Publication No. WO 2009-060944). The molecular properties and physical properties of the resulting film are summarized in Table 1. In addition, the results of evaluating as a capacitor film are summarized in Table 2. Furthermore, the difference in molecular weight differential values, molecular weight (Mw), molecular weight distribution (Mw/Mn), mesopentad fraction and residual amount of secondary antioxidant shown in Table 1 are analytical values of the film.

TABLE 1

| | Raw material resin | Presence or absence of peroxidation treatment | Difference of the differential distribution value (%) | Molecular weight Mw/10⁴ | Molecular weight distribution Mw/Mn | Stereo-regularity (NMR) (mmmm) (%) | Residual secondary agent (ppm) | Thickness (μm) | Surface roughness Ra (μm) | Surface roughness Rz (μm) |
|---|---|---|---|---|---|---|---|---|---|---|
| Ex. 1 | Resin A | Yes | 11 | 26 | 6 | 96.5 | 4200 | 2.8 | 0.05 | 0.75 |
| Ex. 2 | Resin B | Yes | 10 | 25 | 6.5 | 96 | 4100 | 2.8 | 0.07 | 0.96 |
| Ex. 3 | Resin C | Yes | 9.5 | 27 | 5 | 96 | 4500 | 2.8 | 0.06 | 0.85 |
| Ex. 4 | Resin D | Yes | 12 | 26 | 5 | 97 | 5100 | 2.8 | 0.12 | 1.32 |
| Ex. 5 | Resin A | Yes | 10 | 26 | 6 | 96.5 | 4100 | 2.5 | 0.06 | 0.96 |
| Comp. Ex. 1 | Resin E | No | 8 | 27 | 6 | 96.5 | 3700 | 2.8 | 0.13 | 1.06 |
| Comp. Ex. 2 | Resin E | No | 8 | 27 | 6 | 96.5 | 4500 | 2.8 | 0.10 | 0.98 |
| Comp. Ex. 3 | Resin F | Yes | 10 | 29 | 5 | 93.5 | 4500 | 2.8 | 0.18 | 1.75 |
| Comp. Ex. 4 | Resin G | No | 9 | 26 | 6 | 96 | 3500 | 2.8 | 0.06 | 0.94 |

TABLE 2

| | Dielectric breakdown strength 100° C. (V/μm) | Long-term durability at high temperature (2000 hr.) Capacitance change ratio (%) | Overall evaluation |
|---|---|---|---|
| Example 1 | 470 | −0.5 | A |
| Example 2 | 465 | −1 | A |
| Example 3 | 466 | −2 | A |
| Example 4 | 471 | 0 | A |
| Example 5 | 468 | −1.5 | A |
| Comparative Example 1 | 445 | −15 | C |
| Comparative Example 2 | 450 | −5 | B |
| Comparative Example 3 | 400 | −20 | C |
| Comparative Example 4 | 445 | −5 | B |

As is clear from Examples 1 to 5, in addition to being extremely thin and having high dielectric breakdown voltage values, the biaxially-oriented propylene films of the present invention demonstrated only small decreases in electrostatic capacitance even when capacitor elements obtained by winding the films thereon were continuously subjected to high direct-current voltage loads for a long period of time at high temperatures, demonstrated superior heat resistance and high withstand voltage performance, and were extremely preferable as capacitor films.

However, even if the composition of molecular weight distribution was adjusted with a polymerization according to the prior art, as a result of not carrying out peroxidation treatment, differential distribution values were outside the range of the present invention, and both dielectric breakdown voltage values and long-term durability were inferior (Comparative Example 1).

Moreover, even if the added amount of the secondary antioxidant was increased in a raw material for which molecular weight distribution was adjusted with a polymerization method according to the prior art of Comparative Example 1, although effects were obtained on long-term durability, adequately satisfactory results were unable to be obtained (Comparative Example 2).

Even if molecular weight, the composition of molecular weight distribution and composition of the antioxidant were within the range of the present invention by using a decomposition method according to peroxidation treatment, if stereoregularity (mesopentad fraction) and surface roughness were outside the ranges of the present invention, adequate effects were unable to be obtained (Comparative Example 3).

Effects were unable to be said to always be adequately superior in the case of having adjusted the composition of molecular weight distribution by adding and mixing a high melt flow resin with reference to the prior art, but not carrying out peroxidation treatment (Comparative Example 4).

Performance as a capacitor element was inadequate in all cases unless the conditions for stereoregularity, molecular weight, molecular weight distribution, composition of molecular weight distribution obtained with peroxidation treatment and composition of the antioxidant of the present invention in the biaxially-oriented polypropylene films were simultaneously satisfied (Comparative Examples 1 to 4).

INDUSTRIAL APPLICABILITY

In addition to the biaxially-oriented polypropylene film of the present invention having high withstand voltage performance (dielectric breakdown value) at high temperatures and superior long-term durability (long-term withstand voltage characteristics) at high temperatures, a film capacitor that uses this biaxially-oriented film is not only able to realize a long service life, but since this film is a thin biaxially-oriented film in particular, it can be preferably used in compact, large capacitance-type capacitors requiring heat resistance.

BRIEF DESCRIPTION OF THE REFERENCE SYMBOLS

1: Resin having a high composite ratio of a low molecular weight region
2: Resin having a low composite ratio of a low molecular weight region

The invention claimed is:
1. A biaxially-oriented polypropylene film for a capacitor, wherein, together with having stereoregularity in which mesopentad fraction (mmmm) as determined by measurement of high temperature nuclear magnetic resonance (high temperature NMR) is 94% or more to less than 98%, weight average molecular weight (Mw) as measured by gel permeation chromatography (GPC) is 250,000 to 450,000, molecular weight distribution (Mw/Mn) is 4 to 7, and on a molecular weight distribution curve, the difference determined by subtracting the differential distribution value when the logarithm of molecular weight Log(M)=6 from the differential distribution value when the logarithm of molecular weight Log(M)=4.5 is 9% to 15%; and, uses a polypropylene raw material resin in which the composition of the molecular weight distribution has been adjusted by peroxidative decomposition treatment of a polypropylene resin, wherein the biaxially-oriented polypropylene film contains at least one type of hindered phenol-based antioxidant having a carbonyl group, and the residual content thereof in the film is 4000 ppm (by weight) to 6000 ppm (by weight).

2. The biaxially-oriented polypropylene film for a capacitor according to claim 1, wherein the biaxially-oriented polypropylene film is finely surface-roughened, the surface roughness thereof has a center line average roughness (Ra) of 0.05 μm to 0.15 μM, and the maximum height (Rz, formerly Rmax as defined in JIS) is 0.5 μm to 1.5 μm.

3. The biaxially-oriented polypropylene film for a capacitor according to claim 1, wherein the thickness of the biaxially-oriented polypropylene film is 1 μm to 5 μM.

4. A method for producing a biaxially-oriented polypropylene film for a capacitor, comprising:
  subjecting a polypropylene raw material resin to peroxidative decomposition treatment so as to adjust a molecular weight distribution (Mw/Mn), wherein
  the biaxially-oriented polypropylene film contains at least one type of hindered phenol-based antioxidant having a carbonyl group, and the residual content of the hindered phenol-based antioxidant in the film is 4000 ppm (by weight) to 6000 ppm (by weight), and
  the biaxially-oriented polypropylene film has:
  stereoregularity in which mesopentad fraction (mmmm) as determined by measurement of high temperature nuclear magnetic resonance (high temperature NMR) is 94% or more to less than 98%;
  a weight average molecular weight (Mw) as measured by gel permeation chromatography (GPC) within a range of 250,000 to 450,000;
  the molecular weight distribution (Mw/Mn) within a range of 4 to 7; and
  the difference, which is determined by subtracting the differential distribution value at the logarithm of molecular weight Log(M)=6 from the differential distribution value at the logarithm of molecular weight Log(M)=4.5 on a molecular weight distribution curve, within a range from 9% to 15%.

5. The method for producing a biaxially-oriented polypropylene film for a capacitor according to claim 4, further comprising: finely surface-roughening the biaxially-oriented polypropylene film so as to realize the surface roughness in which a center line average roughness (Ra) is within a range of 0.05 μm to 0.15 μm and the maximum height (Rz, formerly Rmax as defined in JIS) is within a range of 0.5 μm to 1.5 μM.

6. The method for producing a biaxially-oriented polypropylene film for a capacitor according to claim 4, wherein the thickness of the biaxially-oriented polypropylene film is within a range of 1 μm to 5 μm.

* * * * *